(12) United States Patent
Kawachiya et al.

(10) Patent No.: US 7,543,295 B2
(45) Date of Patent: Jun. 2, 2009

(54) METHOD FOR ENHANCING EFFICIENCY IN MUTUAL EXCLUSION

(75) Inventors: Kiyokuni Kawachiya, Kanagawa-ken (JP); Akira Koseki, Kanagawa-ken (JP); Tamiya Onodera, Tokyo (JP); Graeme Johnson, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 11/873,777

(22) Filed: Oct. 17, 2007

(65) Prior Publication Data

US 2008/0104595 A1   May 1, 2008

(30) Foreign Application Priority Data

Oct. 31, 2006 (JP) ............................. 2006-296299

(51) Int. Cl.
G06F 9/46 (2006.01)
(52) U.S. Cl. ........................................ 718/102; 718/104
(58) Field of Classification Search ................. 718/102, 718/104
See application file for complete search history.

(56) References Cited

U.S. PATENT DOCUMENTS

| 5,352,397 | A | 10/1994 | Hara et al. | |
|---|---|---|---|---|
| 2003/0041225 | A1* | 2/2003 | Mattina et al. | 712/30 |
| 2007/0094669 | A1* | 4/2007 | Rector et al. | 718/104 |

FOREIGN PATENT DOCUMENTS

| JP | 1310466 | 12/1989 |
|---|---|---|
| JP | 5064825 | 3/1993 |
| JP | 10254769 | 9/1998 |
| JP | 2002175287 | 6/2002 |

* cited by examiner

Primary Examiner—Lewis A Bullock, Jr.
Assistant Examiner—Camquy Truong
(74) Attorney, Agent, or Firm—Rosa S. Yaghmour; Shimokaji & Associates, P.C.

(57) ABSTRACT

A system of the present invention includes: a memory device which includes a first memory area for storing first information indicating that a first task acquires or attempts to acquire a lock, and a second memory area for storing second information indicating that a second task acquires or attempts to acquire the lock, and in which a time lag may occur between a time when the first task issues a writing instruction and a time when the written content is enabled to be referred to by the second task; a first acquisition section which reads the second memory area after issuing a writing instruction to write the first information to the first memory area in response to a request from the first task, and which makes a reply indicating a success of the lock acquisition on condition that the second information is not read; and a second acquisition section which writes the second information to the second memory area in response to a request from the second task, which enables the written content to be referred to by the first task, which thereafter executes a write-reflection process for enabling the content written in the first memory area by the first task to be referred to by the second task, which reads the first memory area after completion of the write-reflection process, and which makes a reply indicating a success of the lock acquisition on condition that the first information is not read from the first memory area.

1 Claim, 14 Drawing Sheets

```
1 int flag = 0;
2
3 lock() {
4   if (compare_and_swap(&flag, 0, thread_id())==SUCCESS) return SUCCESS;
5   return FAILED; // will retry, or goto heavy lock
6 }
7
8 unlock () { flag = 0; }
```

FIG. 1

```
1 int flags[2] = { 0, 0 } ;
2
3 lock_by_A() { // for Thread A
4   flags[0] = 1;
5   store_load_barrier() ;
6   if (flags[1] == 0) return SUCCESS;
7   flags[0] = 0;
8   return FAILED; // will retry, or goto heavy lock
9 }
10
11 unlock_by_A() { flags[0] = 0; }
12
13 lock_by_B() { // for Thread B
14   flags[1] = 1;
15   store_load_barrier() ;
16   if (flags[0] == 0) return SUCCESS;
17   flags[1] = 0;
18   return FAILED; // will retry, or goto heavy lock
19 }
20
21 unlock_by_B() { flags[1] = 0; }
```

FIG. 2

```
1  int flags[2] = { 0, 0 } ;
2
3  lock_by_A() { // for Thread A
4    flags[0] = 1;
5    store_load_barrier() ;
6    if (flags[1] == 0) return SUCCESS;
7    flags[0] = 0;
8    return FAILED; // will retry, or goto heavy lock
9  }
10
11 unlock_by_A()  { flags[0] = 0; }
12
13 lock_by_Others() { // for Other Threads
14   if (compare_and_swap(&flags[1], 0, thread_id())==SUCCESS) {
15     if (flags[0] == 0) return SUCCESS;
16     flags[1] == 0
17   }
18   return FAILED; // will retry, or goto heavy lock
19 }
20
21 unlock_by_Others()  { flags[1] = 0; }
```

FIG. 3

| TIME | THREAD A | FLAGS VIEWED FROM A | FLAGS VIEWED FROM B | THREAD B |
|---|---|---|---|---|
| T1 | lock_by_A() | {0, 0} | {0, 0} | |
| T2 | flags[0] = 1; | {1, 0} | {0, 0} | |
| T3 | // no barrier | {1, 0} | {0, 0} | |
| T4 | if (flags[1] == 0) | {1, 0} | {0, 0} | |
| T5 | return SUCCESS; | {1, 0} | {0, 0} | |
| T6 | | {1, 0} | {0, 0} | lock_by_B() |
| T7 | | {1, 0} | {0, 1} | flags[1] = 1; |
| T8 | | {1, 1} ←-flag1— | {0, 1} | store_load_barrier(); |
| T9 | | {1, 1} | {0, 1} | if (flags[0] == 0) |
| T10 | | {1, 1} | {0, 1} | return SUCCESS; |

FIG. 4

```
1  int flags[2] = { 0, 0 } ;
2
3  lock_by_A()  { // for Thread A
4    flags[0] = 1;
5    // no barrier
6    if (flags[1] == 0) return SUCCESS;
7    flags[0] = 0;
8    return FAILED; // will retry, or goto heavy lock
9  }
10
11 unlock_by_A()  { flags[0] = 0; }
12
13 lock_by_B()  { // for Thread B
14   flags[1] = 1;
15   store_flushing() ;
16   flushThreadMemory(thread_A)
17   load_barrier()
18   if (flags[0] == 0) return SUCCESS;
19   flags[1] = 0;
20   return FAILED; // will retry, or goto heavy lock
21 }
22
23 unlock_by_B()  { flags[1] = 0; }
```

FIG. 8

| TIME | THREAD A | FLAGS VIEWED FROM A | FLAGS VIEWED FROM B | THREAD B |
|---|---|---|---|---|
| T1 | lock_by_A() | {0, 0} | {0, 0} | |
| T2 | flags[0] = 1; | {1, 0} | {0, 0} | |
| T3 | // no barrier | {1, 0} | {0, 0} | |
| T4 | if (flags[1] == 0) | {1, 0} | {0, 0} | |
| T5 | return SUCCESS; | {1, 0} | {0, 0} | |
| T6 | | {1, 0} | {0, 0} | lock_by_B() |
| T7 | | {1, 0} | {0, 1} | flags[1] = 1; |
| T8 | | {1, 1} <–flag1– | {0, 1} | store_flushing() ; |
| T9 | | {1, 1} —flag0–> | {1, 1} | flushThreadMemory(thread_A) |
| T10 | | {1, 1} | {1, 1} | load_barrier() ; |
| T11 | | {1, 1} | {1, 1} | if (flags[0] == 0) |
| T12 | | {1, 1} | {1, 1} | else LOCK FAILURE |

FIG. 9

```
1  int flags[2] = { 0, 0 } ;
2
3  lock_by_A()  { // for Thread A
4    flags[0] = 1;
5    // no barrier
6    if (flags[1] == 0) return SUCCESS;
7    flags[0] = 0;
8    return FAILED; // will retry, or goto heavy lock
9  }
10
11 unlock_by_A()  { flags[0] = 0;}
12
13 lock_by_Others()  { // for Other Threads
14   if (compare_and_swap(&flags[1], 0, thread_id())==SUCCESS) {
15     flushThreadMemory(thread_A) ;
16     load_barrier() ;
17     if (flags[0] == 0) return SUCCESS;
18     flags[1] = 0;
19   }
20   return FAILED; // will retry, or goto heavy lock
21 }
22
23 unlock_by_Others()  { flags[1] = 0; }
```

FIG. 12

```
1 flushThreadMemory(thread_id)  {
2     completion flag=0 ;
3     signal_send(thread_id, SIGxxx) ;
4     <wait until the signal is processed by the target thread, or do other work>
5 }
6
7 SIGxxx_handler()  { // called when SIGxxx is received
8    store_load_barrier()
9    completion flag=1 ;
10 }
```

FIG. 13

```
1 flushThreadMemory(thread_id)  {
2     thread_suspend(thread_id) ;
3     thread_resume(thread_id) ;
4 }
```

FIG. 14

```
1 flushThreadMemory(thread_id)  {
2     <wait for a while, or do other work>
3 }
```

FIG. 15

METHOD FOR ENHANCING EFFICIENCY IN MUTUAL EXCLUSION

BACKGROUND OF THE INVENTION

The present invention relates to a method for improving efficiency in mutual exclusion. In particular, the present invention relates to a method for improving efficiency in mutual exclusion for arbitrating a race condition of operations respectively executed by multiple tasks.

A recent operating system (hereinafter, abbreviated as an OS) or middleware enables multiple threads to operate asynchronously and in parallel. In some cases, the multiple threads simultaneously access a shared resource in a computer such as a certain area in a memory or an input/output device, for example. In addition, a program may include an instruction string (a critical section) which is executed by a certain thread, and during execution of which another thread must not concurrently execute its instruction. In these cases, mutual exclusion is required for arbitrating a race condition of operations executed by the competing threads.

Heretofore, an atomic operation instruction such as compare_and_swap has been used for achieving efficient mutual exclusion. The atomic operation instruction is efficient since the instruction can be executed in a user mode, and does not require returning a process to an OS for the mutual exclusion. However, the atomic operation instruction requires a longer execution time than other instructions (for example, a computing instruction, a reading instruction from a memory, and the like). For this reason, even by using the atomic operation instruction, a problem of the execution time required for the mutual exclusion sometimes occurs.

In order to solve the problem, the techniques have been proposed for shortening a time required for the mutual exclusion in a way that the atomic operation instruction is made unnecessary by providing a memory area indicating a state of acquiring a lock for each thread (see reference to: E. W. Dijkstra, Solution of a Problem in Concurrent programming and Control, CACM, 8(9), p. 569, 1965; and T. Onodera, K. Kawachiya, and A. Koseki, Lock Reservation for Java Reconsidered. Proc. ECOOP '04, pp. 560-584, 2004). In a case where these techniques are applied to a computer employing a weakly-ordered memory model, a memory barrier instruction is needed instead of the atomic operation instruction. The memory barrier instruction is an instruction to enable a content written in a memory by a processor to be referred to by another processor. In accordance with the memory barrier instruction, it is possible to forcibly enable a content written by a processor to be referred to by another processor even when a time lag occurs between a time of writing and a time when the written content is enabled to be referred to.

However, the memory barrier instruction also requires a longer time for the execution than the other instructions. Accordingly, the time required for the mutual exclusion may also become a problem even by employing these techniques.

SUMMARY OF THE INVENTION

Against this background, an object of the present invention is to provide a system, a program and a method for solving the foregoing problems. This object is achieved by a combination of independent claims in the scope of claims. Moreover, dependent claims define more advantageous specific examples of the present invention.

In order to solve the above problems, an aspect of the present invention is a system which executes mutual exclusion between multiple tasks, and which includes a memory device, a first acquisition section, a first release section, a second acquisition section and a second release section. The memory device includes a first memory area for storing first information indicating that a first task acquires or attempts to acquire a lock, and a second memory area for storing second information indicating that a second task acquires or attempts to acquire the lock. In the memory device, there may be a time lag between a time when the first task issues a writing instruction and a time when the written content is enabled to be referred to by the second task. The first acquisition section reads the second memory area after issuance of a writing instruction to write the first information to the first memory area in response to a request for the first task to acquire the lock. Then, on condition that the second information is not read, the first acquisition section makes a reply indicating a success of the lock acquisition. In contrast, on condition that the second information is read, the first acquisition section erases the first information from the first memory area, and makes a reply indicating a failure of the lock acquisition. The first release section erases the first information from the first memory area in response to a request for the first task to release the lock. The second acquisition section writes the second information to the second memory area in response to a request for the second task to acquire the lock, and enables the written content to be referred to by the first task. Thereafter, the second acquisition section executes a write-reflection process for enabling the content written in the first memory area by the first task to be referred to by the second task. After the completion of the write-reflection process, the second acquisition section reads the first memory area. On condition that the first information is not read from the first memory area, the second acquisition section makes a reply indicating a success of the lock acquisition. In contrast, on condition that the first information is read, the second acquisition section erases the second information from the second memory area, and makes a reply indicating a failure of the lock acquisition. The second release section erases the second information from the second memory area in response to a request for the second task to release the lock.

Note that the outline of the present invention mentioned above is not an enumerated list including all of the necessary features of the present invention, and any sub-combination of these features may be included in the present invention.

BRIEF DESCRIPTION OF THE DRAWINGS

For a more complete understanding of the present invention and the advantage thereof, reference is now made to the following description taken in conjunction with the accompanying drawings.

FIG. 1 shows a first implementation example of mutual exclusion.

FIG. 2 shows a second implementation example of the mutual exclusion.

FIG. 3 shows a third implementation example of the mutual exclusion.

FIG. 4 shows an example of a problem occurring if a memory barrier instruction is not executed in the second implementation example.

FIG. 8 shows an implementation example of mutual exclusion according to this embodiment.

FIG. 9 shows an example in which the mutual exclusion of this embodiment is applied to a weakly-ordered memory model.

FIG. 12 shows an implementation example of mutual exclusion according to the first modified example of this embodiment.

FIG. 13 shows a first example of a write-reflection process.

FIG. 14 shows a second example of the write-reflection process.

FIG. 15 shows a third example of the write-reflection process

DETAILED DESCRIPTIONS OF THE PREFERRED EMBODIMENT(S)

Figure 5:
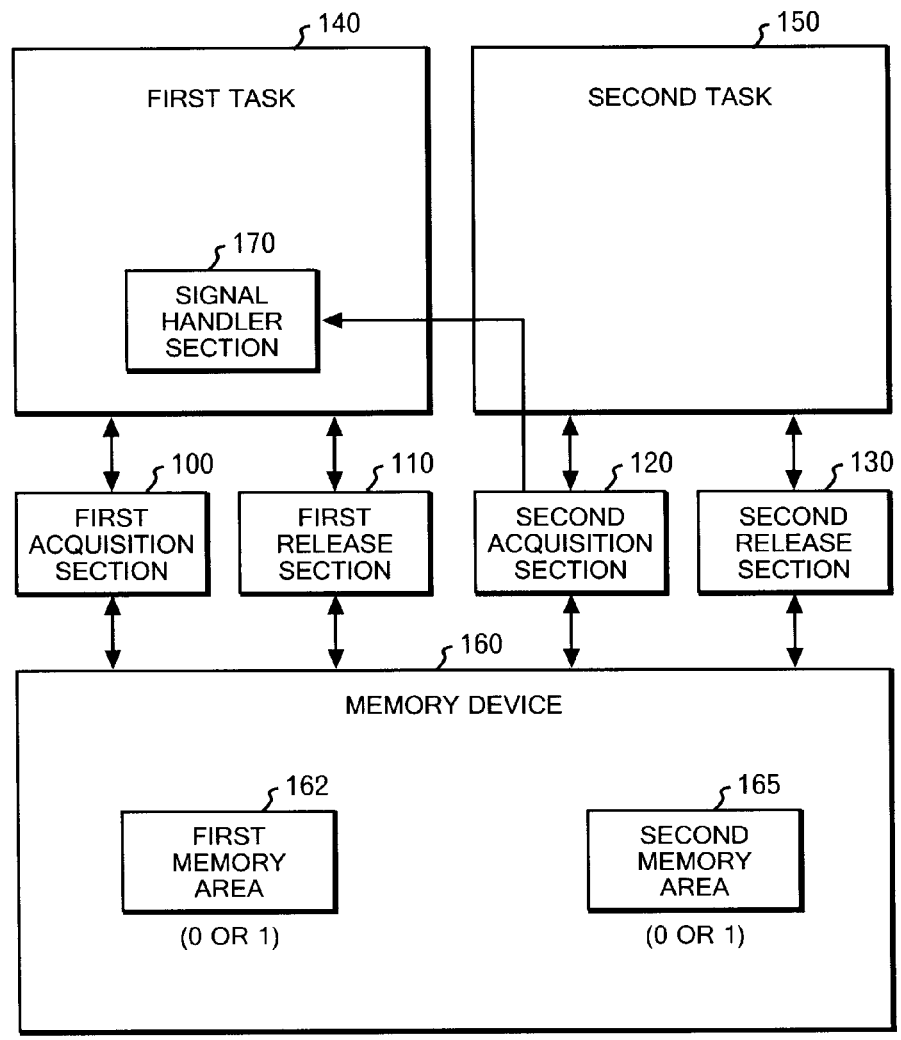
FIG. 5 shows an entire configuration of an information system 10 according to an embodiment.

Hereinafter, the present invention will be described by using a preferred mode for carrying out the present invention (referred to as an embodiment, below). However, the following embodiment does not limit the present invention recited in the scope of claims, and all combinations of features described in the embodiment are not necessarily essential for solving means of the present invention.

FIG. 1 shows a first implementation example of mutual exclusion. The first implementation example employs a compare_and_swap instruction as an atomic operation instruction. Line 1 in FIG. 1 shows a definition of a variable flag that indicates a state of a lock acquisition. If the value of the variable flag is 0, this means that no thread acquires a lock. In contrast, if the value of the variable flag is a value other than 0, this means that any one of the thread acquires the lock. Incidentally, a memory area for this variable is provided on a shared memory that can be referred to by multiple threads. The following descriptions will illustrate variables to which assigned is information that indicates a state of acquiring or attempting to acquire a lock. Memory areas for these variables are also provided on a shared memory that can be referred to by the multiple threads.

A function for attempting to acquire the lock is shown on lines 3 to 6, and a function for releasing the lock is shown on line 8. The compare_and_swap instruction shown on line 4 is the atomic operation instruction. This instruction causes the value of the variable flag to be read and then compared with the constant value 0, and then causes the identification number of a thread to be assigned to the variable flag, if these values are equal to each other. In this way, this instruction causes the three processes of reading, comparing and writing to be executed as an atomic unit. In other words, while a certain processor is executing these three processes on a certain variable, a different processor cannot execute a writing process on this variable. For this reason, a content in the memory is not rewritten by the different processor during the three processes from reading to writing. Thereby, if the read value is the constant value 0, the function returns a return value indicating a success of the lock acquisition (at the end of line 4). In contrast, if the read value is not the constant value 0, the function returns a return value indicating a failure of the lock acquisition (on line 5).

Note that the function of compare_and_swap is a function that, if a read result of a variable given as a first argument is equal to the constant value 0 given as a second argument, assigns a value of a third argument to the variable, and then returns, as a return value, the constant value SUCCESS indicating a success of the lock acquisition.

Even by using the atomic operation instruction, however, a time required for the mutual exclusion may become a problem, since the atomic operation instruction requires a longer time for the execution than other instructions (for example, a simple reading and writing instruction) executed by a CPU. In order to avoid this, a memory barrier instruction may be used instead of the atomic operation instruction for further shortening a time required for the mutual exclusion.

FIG. 2 shows a second implementation example of the mutual exclusion. In this second implementation example, a memory barrier instruction is used instead of the atomic operation instruction. Line 1 in FIG. 2 shows a definition of an array variable flags indicating a state of a lock acquisition. The array variable flags contains a first element and a second element. If the first element is 0, this means that thread A does not acquire a lock. If the first element is 1, this means that thread A acquires or attempts to acquire the lock. In addition, if the second element is 0, this means that thread B does not acquire the lock. If the second element is 1, this means that thread B acquires or attempts to acquire the lock.

A function for causing thread A to attempt to acquire the lock is shown on lines 3 to 9. This function is called by thread A, and starts executing a process. Firstly, 1 is assigned to a first element on line 4. This assignment process is equivalent to a process in which a writing instruction to a memory is issued to the CPU. In a case of a computer employing the weakly-ordered memory model, thread B cannot always refer immediately to a content written by thread A in response to a writing instruction, even after the issuance of the instruction. Subsequently, the memory barrier instruction is executed on line 5. This memory barrier instruction plays a role in enabling the content written on line 4 to be referred to by thread B. Moreover, this memory barrier instruction also plays a role in ensuring that a reading instruction from the memory issued after the execution of the memory barrier instruction is not executed before the completion of the process executed by the memory barrier instruction.

The instruction on line 6 is an instruction to read a second element, to compare the second element with a constant value 0, and then to return a constant value SUCCESS indicating a success of a lock acquisition, if they are equal to each other. The instruction on lines 7 and 8 is an instruction which is executed if the acquisition fails, which assigns the constant value 0 to the first element, and which then returns a constant value FAILED indicating the failure of the lock acquisition.

In addition, a function to release the lock for thread A is shown on line 11. This function starts executing a process when called by thread A. This function assigns 0 to the first element, and terminates the process.

A function to attempt to acquire the lock for thread B is shown on lines 13 to 19, and a function for causing thread B to release the lock is shown on line 21. These processes for thread B are the same as those for thread A. In other words, the explanation of the processes can be obtained by replacing the first element in the array variable with the second element therein, the second element in the array variable with the first element therein, and thread A with thread B.

As such, in the second implementation example, thread A is associated with the first element in the array variable, and thread B is associated with the second element in the array variable. Then, each of threads A and B writes only the associated element. For this reason, threads A and B do not compete to access one element in the array variable (i.e., a memory area on the memory). This eliminates the necessity of using the atomic operation instruction.

FIG. 3 shows a third implementation example of the mutual exclusion. In this implementation example, a race condition for an access among three threads or more can be arbitrated by using only two elements in an array variable as memory areas as is the case with the second implementation example. However, it is only one thread (here, thread A) that does not need the atomic operation instruction for a process of acquiring a lock, and each of the other threads needs the atomic operation instruction for a process of acquiring the lock. In other words, this implementation example is effective in a case where thread A attempts to acquire the lock at high frequency.

Specifically, a definition of an array variable flags indicating a state of a lock acquisition is shown on line 1 in FIG. 3. The array variable flags includes a first element and a second element. If the first element is 0, this means that thread A does not acquire the lock, and if it is 1, this means that thread A acquires or attempts to acquire the lock. If the second element is 0, this means that any thread other than thread A does not acquire the lock, and if it is a value other than 0, this means that the thread specified by the value acquires or attempts to acquire the lock.

A function to attempt to acquire the lock for thread A is shown on lines 3 to 9, and a function to release the lock for thread A is shown on line 11. These functions are the same as those causing thread A to execute the processes described by referring to FIG. 2, therefore the explanation is omitted here. Moreover, a function to attempt to acquire the lock for causing any thread different from thread A is shown on lines 13 to 19. This function starts executing a process when being called by the different thread, and executes the atomic operation instruction as shown on line 14. This atomic operation instruction reads the second element in the array variable from a memory, and compares the second element with the constant value 0. If they are matched, the atomic operation instruction assigns the identification information of the different thread to the second element, and then outputs, as a return value, a constant value SUCCESS that indicates a success of the assignment. Since the identification information of a thread can be obtained by issuing a system call, for example, to an OS, the program codes shown in FIG. 3 can be commonly used by all the different threads.

Incidentally, the reason why a barrier instruction is not explicitly used in this function is that the atomic operation instruction is capable of causing an effect equivalent to that of the barrier instruction.

When the assignment to the second element succeeds, the race condition for the access is arbitrated among the multiple threads except thread A. However, thread A and the different thread may compete with each other for the access. For this reason, as shown on line 15, the first element in the array variable is read from the memory, and then is compared with the constant value 0. If they are matched, the constant value SUCCESS indicating a success of the lock acquisition is returned. If they are not matched, the function on line 16 is executed, and 0 is assigned to the second element in the array variable. In a case of a failure of the lock acquisition including the above case, a constant value FAILED indicating the failure is returned as shown on line 18.

A function to release the lock for the thread different from thread A is shown on line 21. This function simply assigns 0 to the second element in the array variable.

As described heretofore by referring to FIGS. 1 to 3, the mutual exclusion is preferably achieved by using the memory barrier instruction, or both of the atomic operation instruction and the memory barrier instruction, although the mutual exclusion can be achieved by using only the atomic operation instruction. This is because the atomic operation instruction requires a longer execution time than other instructions. However, the memory barrier instruction also requires a longer execution time than other usual instructions (such as a reading instruction from a memory, or a writing instruction to a memory). For this reason, when the mutual exclusion is frequently executed, a time required for the execution may become a problem in some cases.

For a problem of the time required for executing the memory barrier instruction, if happens, a possible countermeasure is that one of threads frequently attempting to acquire a lock (here, the one is assumed as thread A) is prohibited from executing the memory barrier instruction. However, in a case where this countermeasure is implemented in a computer adopting a weakly-ordered memory model, another problem may occur. FIG. 4 shows an example of this case.

FIG. 4 shows an example of the problem caused when the memory barrier instruction is not executed in the second implementation example. The example shown in FIG. 4 indicates a process procedure in the second implementation example. Thread A acquires a lock during a period from time T1 to time T5. Precisely, 1 is assigned to the first element in the array variable in response to a request from thread A, the second element in the array variable is compared with the constant value 0, and then a return value indicating a success of the acquisition is returned because the second element and the constant value 0 match. However, the memory barrier instruction is not executed here. At this point, the elements in the array variable that can be referred to by thread A are {1, 0}. On the other hand, the elements in the array variable that can be referred to by thread B still remain as {0, 0}.

Subsequently, thread B attempts to acquire the lock during a period from time T6 to time T10. More precisely, 1 is assigned to the second element in the array variable in response to a request from thread B, and the memory barrier instruction is executed. This execution enables the constant value 1 assigned to the second element in the array variable to be referred to by thread A. Next, at time T9, the first element in the array variable is compared with the constant value 0. Although thread A has assigned 1 to this first element, thread B cannot read the assigned result due to a delay of update for reflecting the written content. As a result, the first element in the array variable matches the constant value 0, and thereby thread B also succeeds in acquiring the lock. Accordingly, both of thread A and thread B acquire the same lock, and this means a failure to arbitrate operations In contrast to this, in a case where thread B attempts to acquire a lock, and even in a case where a delay occurs in the timing at which a content written in a memory by thread A is enabled to be referred to, an information system 10 according to this embodiment forcibly enables the written content to be referred to by thread B. Thereby, it is possible to eliminate the necessity of execution of the memory barrier instruction for thread A, while preventing a failure to arbitrate operations. Hereinafter, this embodiment will be described in detail.

FIG. 5 shows an entire configuration of the information system 10 according to this embodiment. The information system 10 includes a first acquisition section 100, a first release section 110, a second acquisition section 120, a second release section 130, a memory device 160 and a signal handler section 170. Moreover, the information system 10 causes a first task 140 and a second task 150 to operate. Firstly, relationships among hardware resources will be described. A program stored in a later-described RAM 1020 causes later-described CPUs 1000-1 and 1000-2 to operate as the first acquisition section 100, the first release section 110, the second acquisition section 120, the second release section 130 and the signal handler section 170. This program is a library program which may be combined with a user program, and which may operate in response to a function call or a method call in the user program.

Each of the first task 140 and the second task 150 is a thread controlled, for example, by an operating system and middleware (for example, a Java virtual machine). To be more precise, the entity of each thread is an execution context such as a program execution location, a content of a register and a content of a stack, and operates as each of the first task 140 and the second task 150 when the CPUs 1000-1 and 1000-2 executes the program by referring to the execution context. Instead of this, each of the first task 140 and the second task 150 may be a process, and the two tasks may be implemented by the respective execution contexts having independent address spaces. The memory device 160 is implemented by the RAM 1020, a hard disk drive 1040 or the like, which will be described later.

The memory device 160 operates under control of a memory controller or the like in accordance with the weakly-ordered memory model. For example, in the memory device 160, a time lag may occur between a time when the first task 140 executed by the CPU 1000-1 issues a writing instruction, and a time when the written content is enabled to be referred to by the second task 150 executed by the CPU 1000-2. The memory device 160 has a first memory area 162 and a second memory area 165. The first memory area 162 is an area for storing first information indicating that the first task 140 acquires or attempts to acquire a lock. The constant value 1 stored in this area is the first information, and the constant value 0 indicates a state where the first information is not stored. The second memory area 165 is an area for storing second information indicating that the second task 150 acquires or attempts to acquire the lock. The constant value 1 stored in this area is the second information, and the constant value 0 indicates a state where the second information is not stored.

In response to a request for the first task 140 to acquire the lock, the first acquisition section 100 attempts to acquire the lock by accessing the first memory area 162 and the second memory area 165. At this time, since the first acquisition section 100 does not issue the memory barrier instruction, the processing ends in an extremely short time. If the lock is acquired, the first acquisition section 100 sends a reply indicating a success of the lock acquisition to the first task 140. If the lock is not acquired, the first acquisition section 100 sends a reply indicating a failure of the lock acquisition to the first task 140. In response to a request for the first task 140 to release the lock, the first release section 110 erases the first information from the first memory area 162, and releases the lock.

In response to a request for the second task 150 to acquire the lock, the second acquisition section 120 attempts to acquire the lock by accessing the first memory area 162 and the second memory area 165. At this time, the second acquisition section 120 executes the write-reflection process in which the content written in the first memory area 162 by the first task 140 is enabled to be referred to by the second task 150. The write-reflection process may be executed in response to an event where the second acquisition section 120 causes the second task 150 to transmit a signal to the first task 140. The specific implementation method will be described later by referring to FIGS. 13 to 15. Upon receipt of the signal, the signal handler section 170 executes a process of enabling the content written by the first task 140 to be referred to by the second task 150 as a part of the process executed by the first task 140. If the lock is acquired, the second acquisition section 120 sends a reply indicating the success of the lock acquisition to the second task 150. If the lock is not acquired, the second acquisition section 120 sends a reply indicating the failure of the lock acquisition to the second task 150. In response to a request for the second task 150 to release the lock, the second release section 130 erases the second information from the second memory area 165, and releases the lock.

Figure 6:
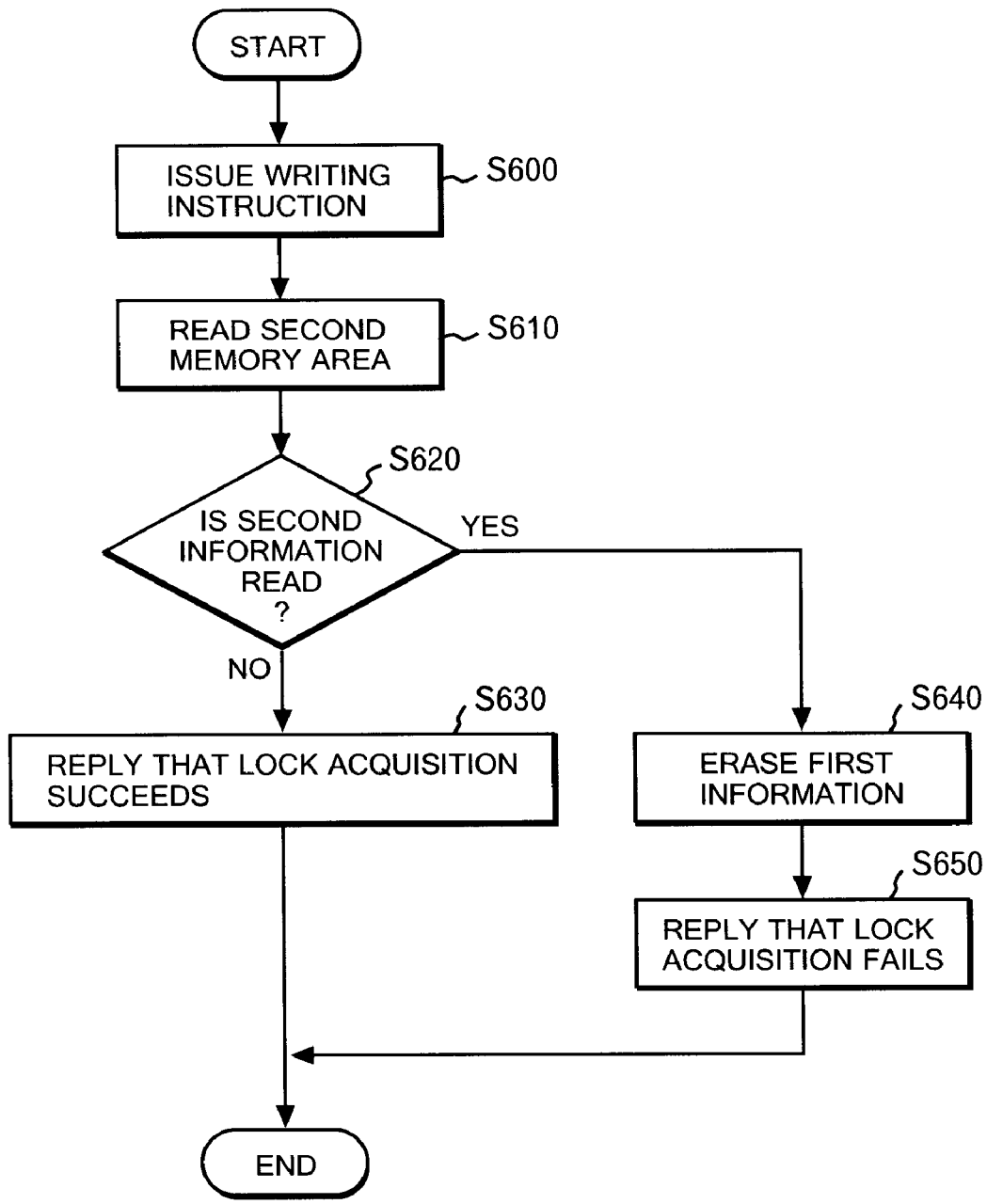
FIG. 6 is a flowchart of a process in which a first acquisition section 100 attempts to acquire a lock.

FIG. 6 is a flowchart of a process in which the first acquisition section 100 attempts to acquire the lock. The first acquisition section 100 starts operating in response to a request for the first task 140 to acquire the lock. This request is a function call or a method call from the program implementing the first task 140. Subsequently, the first acquisition section 100 issues the writing instruction that is an instruction to write the first information to the first memory area 162 (S600), firstly. After issuance of the writing instruction, the first acquisition section 100 reads the second memory area 165 without executing the memory barrier instruction (S610). On condition that the second information is not read (S620: NO), the first acquisition section 100 makes a reply indicating the success of the lock acquisition (S630). Making the reply is a process in which numeric value information indicating the success of the lock acquisition is assigned to a return value to be returned to the function call or the method call, for example. On condition that the second information is read (S620: YES), the first acquisition section 100 erases the first information from the first memory area 162 (S640), and then makes a reply indicating the failure of the lock acquisition (S650). The erase is a process of writing the constant value 0 to the first memory area 162, for example.

Figure 7:
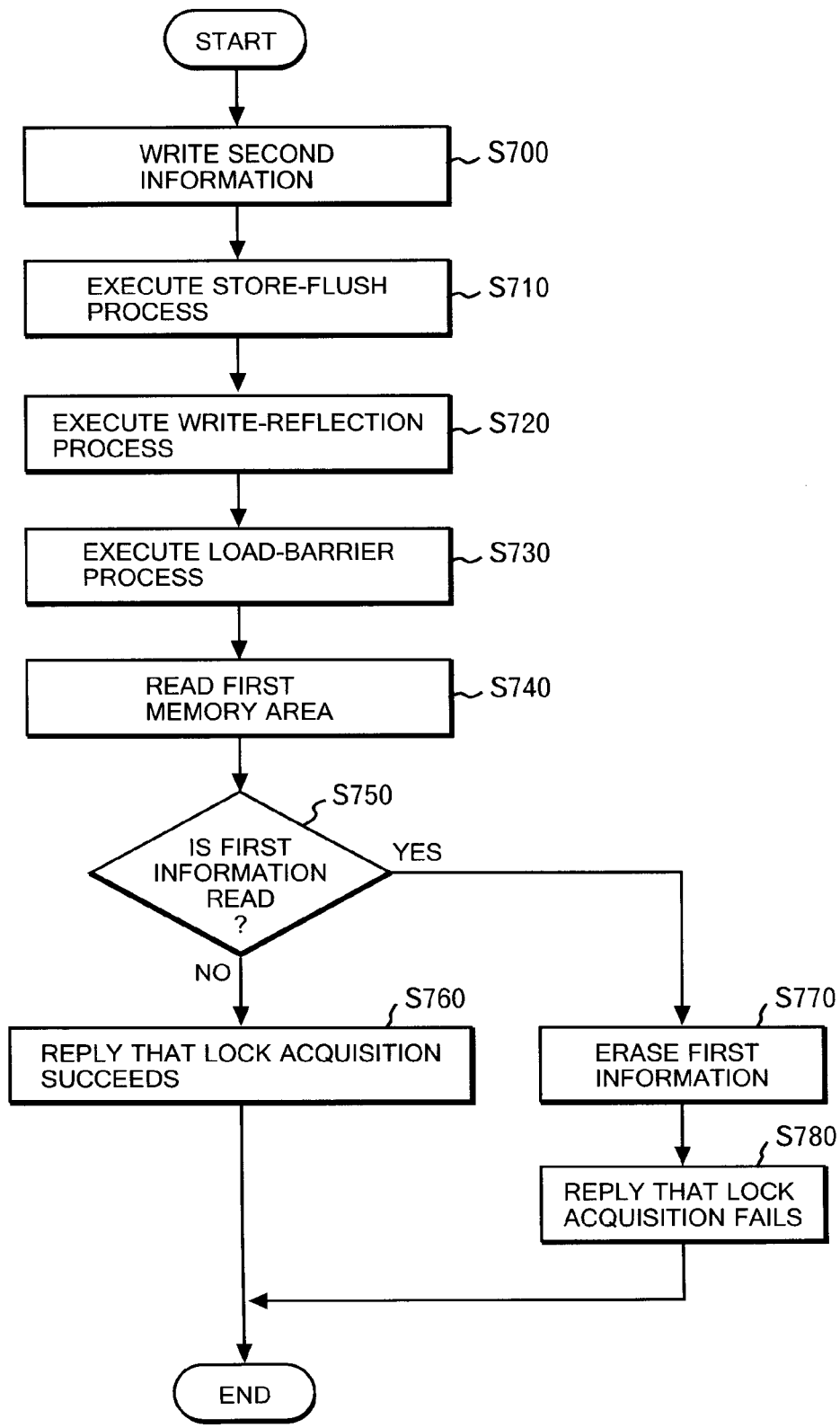
FIG. 7 is a flowchart of a process in which the second acquisition section 120 attempts to acquire the lock.

FIG. 7 is a flowchart of a process in which the second acquisition section 120 attempts to acquire the lock. The second acquisition section 120 starts operating in response to a request for the second task 150 to acquire the lock. Subsequently, the second acquisition section 120 issues the writing instruction to write the second information to the second memory area 165 (S700), firstly. Then, the second acquisition section 120 executes a store-flush process of enabling the written content to be referred to by the first task 140 (S710). Thereafter, the second acquisition section 120 executes the write-reflection process in which the content written in the first memory area 162 by the first task 140 is enabled to be referred to by the second task 150 (S720). Then, the second acquisition section 120 executes a load-barrier process of prohibiting an instruction issued after starting the execution of the write-reflection process from being speculatively executed before completing the execution of the write-reflection process (S730).

After the load-barrier process, that is, in a state where the write-reflection process is surely completed, the second acquisition section 120 reads the first memory area 162 (S740). On condition that the first information is not read from the first memory area 162 (S750: NO), the second acquisition section 120 sends a reply indicating the success of the lock acquisition to the second task 150 (S760). On the other hand, on condition that the first information is read from the first memory area 162 (S750: YES), the second acquisition section 120 erases the second information from the second memory area 165 (S770), and makes a reply indicating the failure of the lock acquisition (S780). Here, the erase is a process to write the constant value 0 to the second memory area 165, for example.

FIG. 8 shows an implementation example of the mutual exclusion according to this embodiment. Lines in the program in FIG. 8 that are different from those in the program in FIG. 2 are indicated by adding side lines to the left sides of the line numbers. The array variable flags shown on line 1 indicates the first memory area 162 and the second memory area 165 in the memory device 160. The first element in the array variable is stored in the first memory area 162, and the second element is stored in the second memory area 165. A function to attempt to acquire the lock for thread A, which is an example of the first task 140, is shown on lines 3 to 9. This function causes the CPU 1000-1 to serve as the first acquisition section 100. Note that this function is different from the function shown in FIG. 2 in that this function does not include the memory barrier instruction on line 5. In addition, the operation of this function is the same as that of the function shown in FIG. 2 except that this function does not execute the memory barrier instruction. For this reason, the explanation for this function is omitted here.

A function to attempt to acquire the lock for thread B, which is an example of the second task 150, is shown on lines 13 to 21. This function is different from the function shown in FIG. 2 in that this function executes the store-flush process, the write-reflection process and the load-barrier process on lines 15 to 17. More specifically, in the store-flush process, a result of assignment to the second element in the array variable flags is enabled to be referred to by thread A. Moreover, in the write-reflection process, a result of assignment to the first element in the array variable flags is enabled to be referred to by thread B. In addition, in the load-barrier process, it is ensured that a subsequent process (for example, a process of reading data from the first element in the array variable flags) is executed after the completion of the write-reflection process.

Here, there is a case where some type of computer executing this program cannot execute the store-flush process or the load-barrier process as an independent instruction, and only can execute the memory barrier instruction for collectively executing both of the store-flush process and the load-barrier process. In this case, the second acquisition section 120 may execute the memory barrier instruction instead of the store-flush process, and then execute the memory barrier instruction again instead of the load-barrier process.

Incidentally, the functions to release the lock shown on lines 11 and 23 are the same as those in the function shown in FIG. 2, and the explanation is omitted here.

FIG. 9 shows an example in which the mutual exclusion according to this embodiment is applied to the weakly-ordered memory model. Processes from time T1 to time T5 are the same as those in the processes shown in FIG. 4. When time T5 passes, the elements in the array variable that can be referred to by thread A are {1, 0}. On the other hand, the elements in the array variable that can be referred to by thread B still remain as {0, 0}. During a period from time T6 to time T10, thread B attempts to acquire the lock. In other words, the second acquisition section 120 writes the second information to the second memory area 165 in response to a request from the thread B. Subsequently, at time T8, the second acquisition section 120 executes the store-flush process. Thereby, the second information written in the second memory area 165 is enabled to be referred to by the first task 140.

Then, at time T9, the second acquisition section 120 executes the write-reflection process. Thereby, the first information written in the memory device 160 by the first task 140 is enabled to be referred to by the second task 150. Thereafter, at time T10, the second acquisition section 120 executes the load-barrier process. Thereby, it is possible to prevent the subsequent reading process from being speculatively executed before completing the execution of the write-reflection process. Then, at time T11, the second acquisition section 120 reads the memory device 160, and makes a comparison with the constant value 0. Here, the first information is read, and this situation indicates a mismatch with the constant value 0. Accordingly, thread B fails to acquire the lock. As a result, thread B cannot acquire the lock while thread A is keeping the lock. Thus, appropriate arbitration is achieved between two competing threads.

AS has been described hereinabove by referring to FIGS. 5 to 9, in the case of arbitrating the race condition of the operations of two threads, it is possible to completely eliminate the necessity of both of the atomic operation instruction and the memory barrier instruction for one of the threads, according to the information system 10 of this embodiment. In a case where processing contents of two threads are different from each other, that is, a case where only one of the threads acquires the lock at high frequency, this configuration can achieve a reduction in a time required for the mutual exclusion as a whole, and thus achieve an enhancement of efficiency in the processes.

Hereinbelow, a first modified example will be described which is a configuration example of achieving the mutual exclusion described in the foregoing embodiment among three threads or more.

Figure 10:
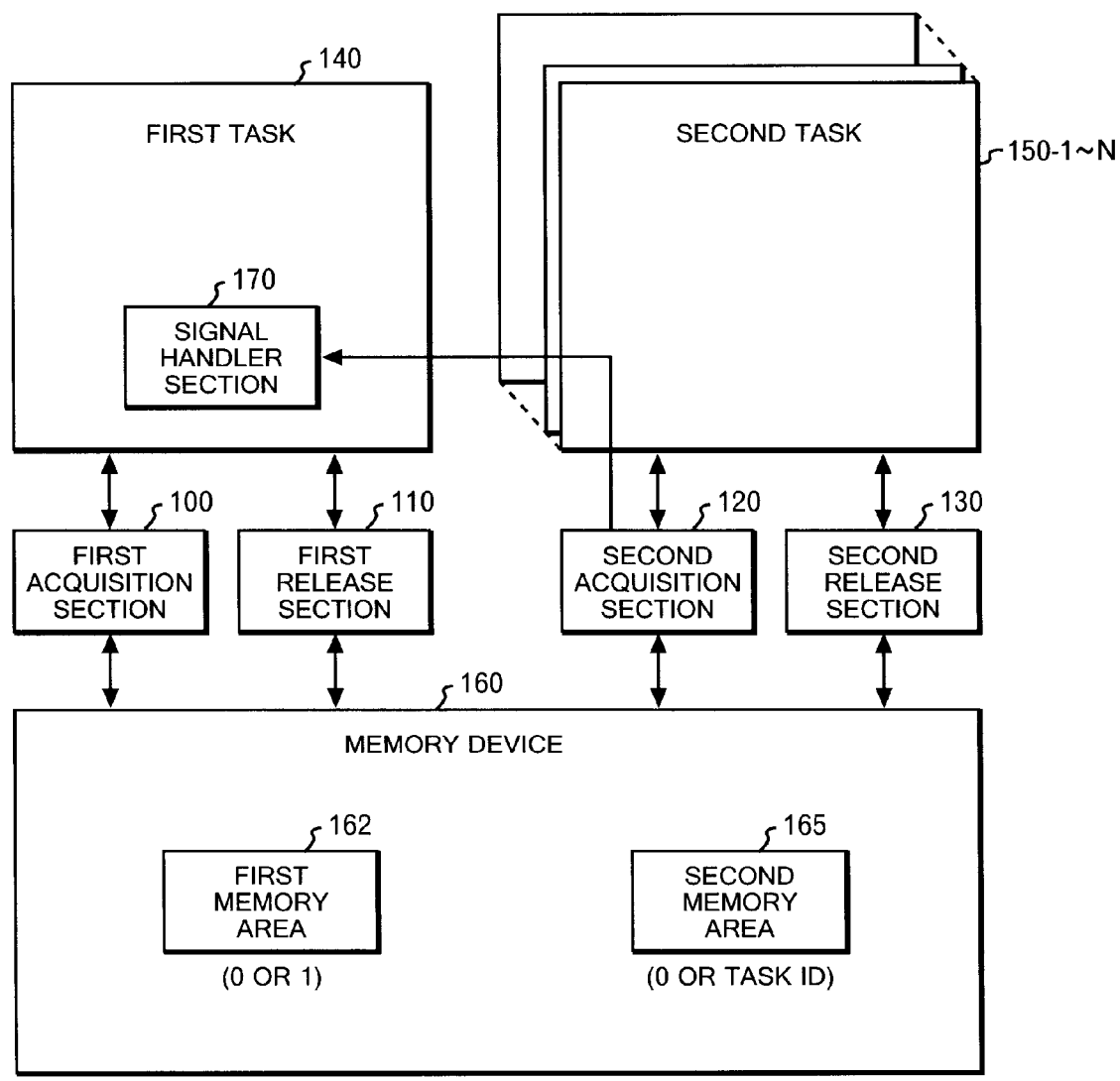
FIG. 10 shows an entire configuration of an information system 10 according to a first modified example of this embodiment.

FIG. 10 shows an entire configuration of an information system 10 according to the first modified example of this embodiment. The information system 10 causes one first task 140 and multiple second tasks 150(second tasks 150-1 to 150-N) to operate. The configuration other than this is substantially the same as that of the information system 10 shown in FIG. 5, and the explanation is omitted here. However, a second memory area 165 does not store 1 as second information, but stores information indicating which second task 150 acquires or attempts to acquire a lock. If none of the second tasks 150 acquires or attempts to acquire the lock, the second memory area 165 stores 0.

Figure 11:
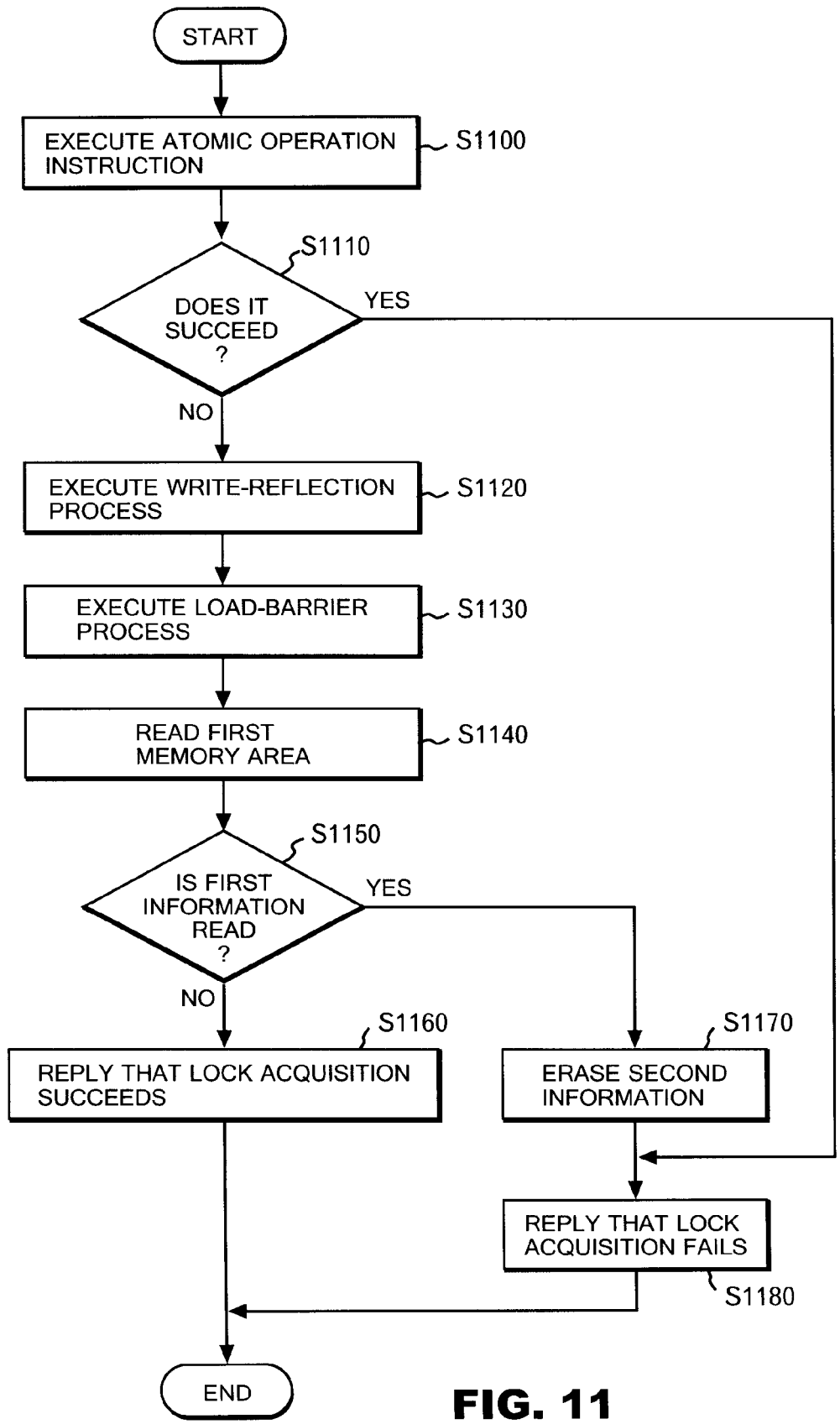
FIG. 11 is a flowchart of a process in which a second acquisition section 120 according to the first modified example of this embodiment attempts to acquire a lock.

FIG. 11 is a flowchart of a process in which a second acquisition section 120 of the first modified example of this embodiment attempts to acquire the lock. Incidentally, a process in which a first acquisition section 100 attempts to acquire the lock is the same as the process described by referring to FIG. 6, and the explanation is omitted here. Firstly, in response to a request to acquire the lock for any one of the second tasks 150-1 to 150-N (the one is simply called the second task 150, below), the second acquisition section 120 executes the atomic operation instruction to write the second information, which specifies the requesting second task 150, to the second memory area 165 if the second memory area 165 does not store the second information (S1100).

On condition that the second information is successfully written by means of the atomic operation instruction (S1110: YES), the second acquisition section 120 executes the write-reflection process (S1120). Then, the second acquisition section 120 executes a load-barrier instruction to prohibit a reading instruction issued after starting the execution of the write-reflection process from being speculatively executed before completing the execution of the write-reflection process (S1130). Thereafter, the second acquisition section 120 reads a first memory area 162 in a state where the write-reflection process is surely completed (S1140).

Note that FIG. 11 does not explicitly show the store-flush process by the second acquisition section 120 for enabling the written content to be referred to by other tasks, since the store-flush process is implicitly executed during the process of the atomic operation instruction.

On condition that first information is not read from the first memory area 162 (S1150: NO), the second acquisition section 120 sends a reply indicating the success of the lock acquisition to second task 150 (S1160). In contrast, on condition that the first information is read (S1150: YES), the second acquisition section 120 erases the second information from the second memory area 165 (S1170), and then makes a reply indicating the failure of the lock acquisition (S1180). In a case where the atomic operation instruction fails to be executed (S1110: NO), the second acquisition section 120 also makes a reply indicating the failure of the lock acquisition (S1180).

FIG. 12 shows an implementation example of the mutual exclusion according to the first modified example of this embodiment. An array variable flags including two elements is shown on line 1. The memory area of the first element is the first memory area 162, and the memory area of the second element is the second memory area 165. Functions to acquire and release a lock for thread A are shown on lines 3 to 11. These functions are the same as those for thread A shown in FIG. 8, and the explanation is omitted here.

Functions to attempt to acquire the lock for any one of the threads other than thread A are shown on lines 13 to 21. The atomic operation instruction on line 14 executes a process of writing the second information specifying the concerned second task 150 to the second memory area 165 if the second memory area 165 does not store the second information. Then, the load-barrier instruction on line 15 executes a process of prohibiting the reading instruction issued after starting the execution of the write-reflection process from being speculatively executed before completing the execution of the write-reflection process. The execution of these processes enables a result written by thread A to be referred to by the other threads even if thread A does not execute the memory barrier instruction.

According to the foregoing first modified example, even in a case of arbitrating operations of three threads or more, it is possible to enhance efficiency in the processes as a whole, by allowing thread A that most frequently acquires the lock not to require the memory barrier instruction.

Hereinbelow, implementation methods for the write-reflection process will be described by referring to FIGS. 13 to 15. As has been described, the write-reflection process is a process in which a thread different from a thread currently executing the write-reflection process is addressed, and in which thereby a content written in the memory area by the different thread is enabled to be referred to by the other threads. The write-reflection process may require an execution time to some extent since it is expected that the process be executed at a relatively low frequency. As a matter of course, it is preferable that the time required for the execution be shorter, but any of the below-described methods may be employed in consideration of characteristics of a system architecture and an application program.

FIG. 13 shows a first example of the write-reflection process. The first example is that the second task 150 transmits a signal to the first task 140, thereby causing the first task 140 receiving the signal to execute the memory barrier instruction. To be more precise, lines 1 to 5 show an implementation example of a function to cause the second acquisition section 120 to transmit the signal from the second task 150 to the first task 140 as an execution of the write-reflection process. On line 2, the second acquisition section 120 resets a flag indicating the last completion of the process of the first task 140 previously receiving the signal. On line 3, the second acquisition section 120 transmits a signal SIGxxx with a thread number thread_id, to which the signal is transmitted, specified. Then, on line 4, the second acquisition section 120 waits until the first task 140 receiving the signal completes the execution of the memory barrier instruction. While waiting, the second task 150 may execute another process. The second acquisition section 120 may recognize the completion of the execution of the memory barrier instruction by reading the completion flag periodically.

A signal handler function for implementing the signal handler section 170 is shown on lines 7 to 10. In response to an event where the first task 140 receives the signal from the second task 150, the signal handler section 170 causes the load-barrier instruction to be executed as a process executed by the first task 140, the load-barrier instruction enabling the written content in the memory device 160 to be referred to by the second task 150. This process is implemented by the instruction on line 8. After that, the signal handler section 170 sets the flag indicating the process completion, and terminates the process. Then, the signal handler section 170 returns the process to the first task 140, and thereby the first task 140 resumes the process executed by the first task 140 before the reception of the signal.

According to the above first example, a task can cause a different task to reflect a content written by the different task by using a function of transmitting and receiving a signal between the tasks.

FIG. 14 shows a second example of the write-reflection process. The second example is that a content written by a task is reflected by suspending the task, and by resuming the task immediately after the suspension. To be more precise, upon receipt of a function call specifying a task ID whose written content is targeted for reflection (line 1), the second acquisition section 120 issues, to the OS, a system call for suspending the task specified by the task ID, and for releasing a CPU executing the task for another task (line 2). In this case, the written content is enabled to be referred to by the other tasks in order to make ready for a context switch.

Immediately after this, the second acquisition section 120 resumes the suspended task, and then causes the CPU to operate the task (line 3). Thereby, the operation of this task is resumed. After the resume, the content written before the suspension can be referred to by the other tasks.

According to the above second example, a content written by a task can be forcibly reflected by another task by using a thread suspension and resume function provided to the operating system.

FIG. 15 shows a third example of the write-reflection process. The third example is that, without causing a different task to reflect a written content, a task waits for a certain fixed period until the different task spontaneously reflects the written content. To be more precise, upon receipt of a request for the write-reflection process (line 1), the second acquisition section 120 waits for a certain fixed period (line 2), and then terminates the process. More specifically, the second acquisition section 120 preferably waits for a time sufficiently exceeding a required time after the first acquisition section 100 issues an instruction to write the first information, until the first information is enabled to be referred to by the second task 150. In a case where the uppermost limit value for such a time is determined in advance in the specification of a memory controller or the like, the second acquisition section 120 may wait for a time determined by the specification. This ensures the execution order of the processes, that is, the first acquisition section 100 firstly writes the first information, and then the second acquisition section 120 reads the first information.

Moreover, in a certain type of architecture of a computer implementing the information system 10, there is a case where the reading instruction issued for causing the first acquisition section 100 to read the second memory area 165 is speculatively executed before the execution of the precedingly-issued instruction. In this case, it is preferable that the second acquisition section 120 add, to the foregoing amount of time, a value of a time difference between the earliest time point of executing the reading instruction and the time point at which the reading instruction is meant to be executed. This allows the second task 150 to appropriately read the written content in a case where the first task 140 writes the content to the first memory area 162 after referring to the second memory area 165.

Incidentally, the second task 150 may execute another process not related to the mutual exclusion while waiting for this time.

Figure 16:
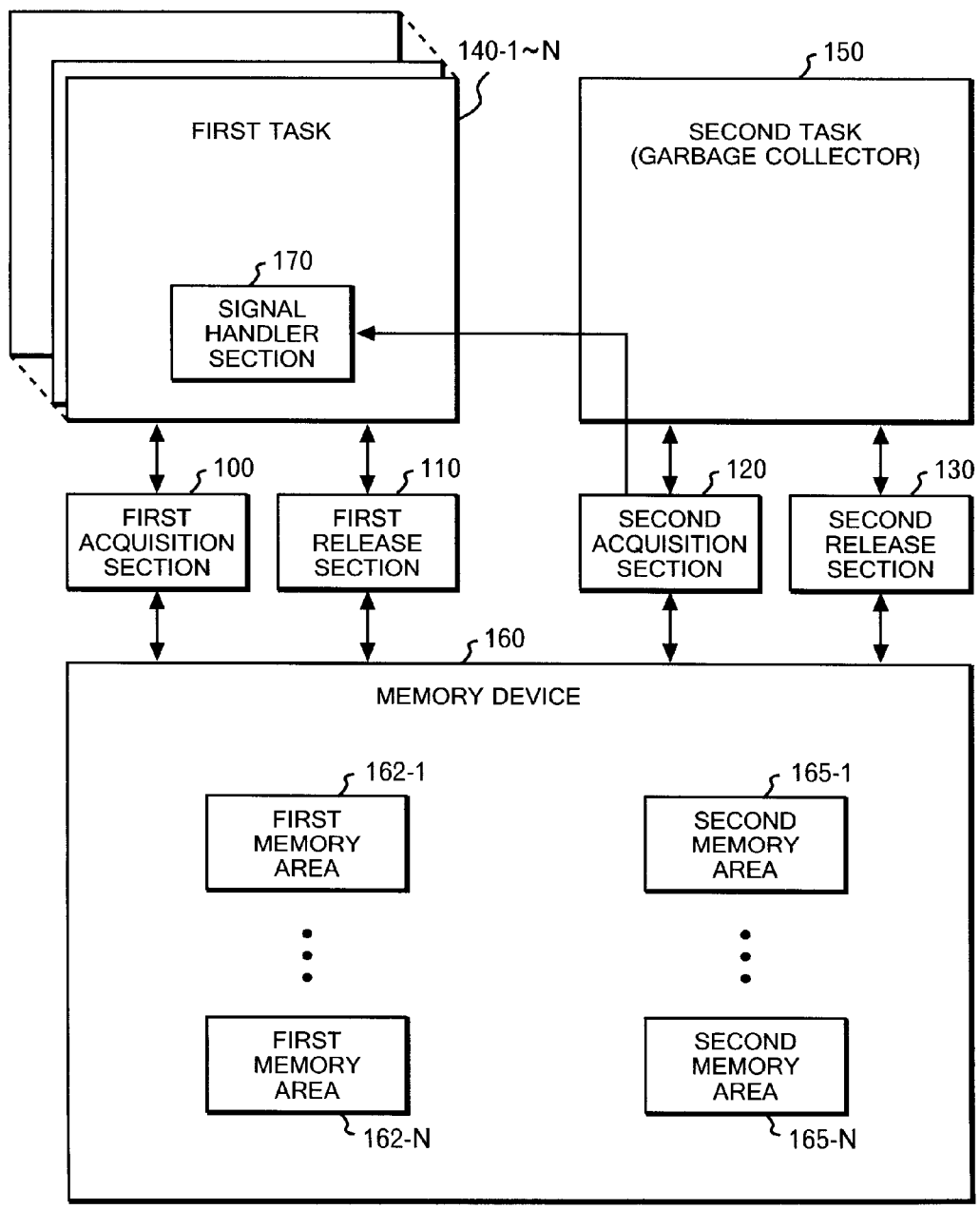
FIG. 16 shows an entire configuration of an information system 10 according to a second modified example of this embodiment.

FIG. 16 shows an entire configuration of an information system 10 according to a second modified example of this embodiment. The information system 10 of the second modified example is different from that in the embodiment described by referring to FIG. 5 in that the information system 10 causes multiple first tasks to operate. Here, these tasks are called first tasks 140-1 to 140-N. The first tasks 140-1 to 140-N are threads each controlled by an OS, middleware or the like, and advances processes of a program independently. During the execution of the program, there is a case where memory areas in a memory device 160 are allocated to the tasks, and used for storing a result of arithmetic processing or for another equivalent purpose.

A memory area allocated while a language processor of a JAVA (registered trademark) language or the like is executing a program is automatically released by software called a garbage collector even when an instruction to release the memory area is not explicitly executed in the program. A second task 150 implements the garbage collector. More specifically, the second task 150 detects a memory area on a memory that is no longer referred to by the first tasks 140-1 to 140-N, and then executes a garbage collection (GC) for releasing the memory area so that the memory area can be used again in a subsequent process. Here, mutual exclusion is needed if a task (for example, the first task 140-1) that reserves and uses a memory area is different from a task (for example, the second task 150) that attempts to release the memory area. The second modified example aims to achieve such mutual exclusion.

The information system 10 includes a memory device 160 as is the case with the information system 10 shown in FIG. 5. However, the memory device 160 in the second modified example is different from the memory device 160 shown in FIG. 5 in that the memory device 160 includes multiple first memory areas 162 respectively corresponding to the multiple first tasks 140, and multiple second memory areas 165 respectively corresponding to the multiple first tasks 140. These areas are called the first memory areas 162-1 to 162-N, and the second memory areas 165-1 to 165-N. The other configurations are substantially the same as those shown in FIG. 5 and the explanation is omitted here.

In the second modified example, a certain first task 140 (for example, the first task 140-1) makes a request to acquire a lock to a first acquisition section 100 before executing a critical section that does not allow a GC to be executed. The critical section described herein is an area in a program for executing a predetermined process during which the second task 150 is not allowed to execute a garbage collection. Then, the first task 140-1 executes the predetermined process on condition that the lock is acquired, and makes a request to release the lock to the first acquisition section 100 after the execution of the predetermined process. Many types of programs to be executed each have a characteristic needing extremely-frequent execution of such a lock acquisition. In addition to this, such a program succeeds in acquiring the lock frequently, and thereby a time required for the lock acquisition is wasted.

Upon receipt of the request for the lock acquisition from the first task 140-1, the first acquisition section 100 executes an instruction to write first information to the first memory area 162-1 corresponding to the first task 140-1, and then reads the second memory area 165-1 corresponding to the first task 140-1. Thereafter, on condition that second information is not read, the first acquisition section 100 makes a reply indicating the success of the lock acquisition. In contrast, on condition that the second information is read, the first acquisition section 100 erases the first information from the first memory area 162-1, and sends a reply indicating the failure of the lock acquisition to the first task 140-1. In response to a request for the first task 140-1 to release the lock, a first release section 110 erases the first information from the corresponding first memory area 162-1.

On the other hand, the second task 150 makes a request for the lock acquisition to a second acquisition section 120 before executing a garbage collection. On condition that all the locks are acquired, the second task 150 executes the garbage collection, and makes a request to release the locks after execution of the garbage collection. The frequency of the garbage collection is lower than that at which the first tasks 140 attempt to acquire the locks. For this reason, it does not matter that the second task takes the execution time required for the lock acquisition to some extent.

From the second task 150, the second acquisition section 120 receives a request to acquire all the locks related to the first tasks 140-1 to 140-N. Thereafter, the acquisition section 120 writes the second information to each of the second memory areas 165-1 to 165-N, and enables the second information to be referred to by all the first tasks 140. As mentioned before, this process for enabling the second information to be referred to may be implemented by using the store-flush instruction, for example. Subsequently, the second acquisition section 120 sequentially transmits multiple requests for the write-reflection processes specifying the first tasks 140-1 to 140-N, respectively. The write-reflection process described herein is a process of transmitting a request to reflect a written content with each first task 140 specified for reflecting the written content, and then of waiting until the written content is reflected. The request to reflect the written content is a transmission of a signal, for example, and the process of waiting until the written content is reflected is to receive a notification indicating the completion of reflection of the written content from the first task 140, for example.

The second acquisition section 120 waits until all the first tasks 140 complete reflecting the written content. Thereafter, upon completion of all the write-reflection processes, the second acquisition section 120 reads each of the first memory areas 162. On condition that the first information is not read from any of the first memory areas 162, the second acquisition section 120 sends a reply indicating the success in acquiring all the locks related to the first tasks 140-1 to 140-N to the second task 150. In contrast, on condition that the first information is read from any of the first memory areas 162, the second acquisition section 120 erases the second information from the second memory area 165 corresponding to the first memory area 162, and sends a reply indicating the failure of the lock acquisition to the second task 150. The operation of a second release section 130 is substantially the same as that shown in FIG. 5. Upon receipt of a request to release all the locks from the second task 150, the second release section 130 erases the second information from each of the second memory areas 165-1 to 165-N. Thereby, the first tasks 140-1 to 140-N can resume the operations.

Figure 17:
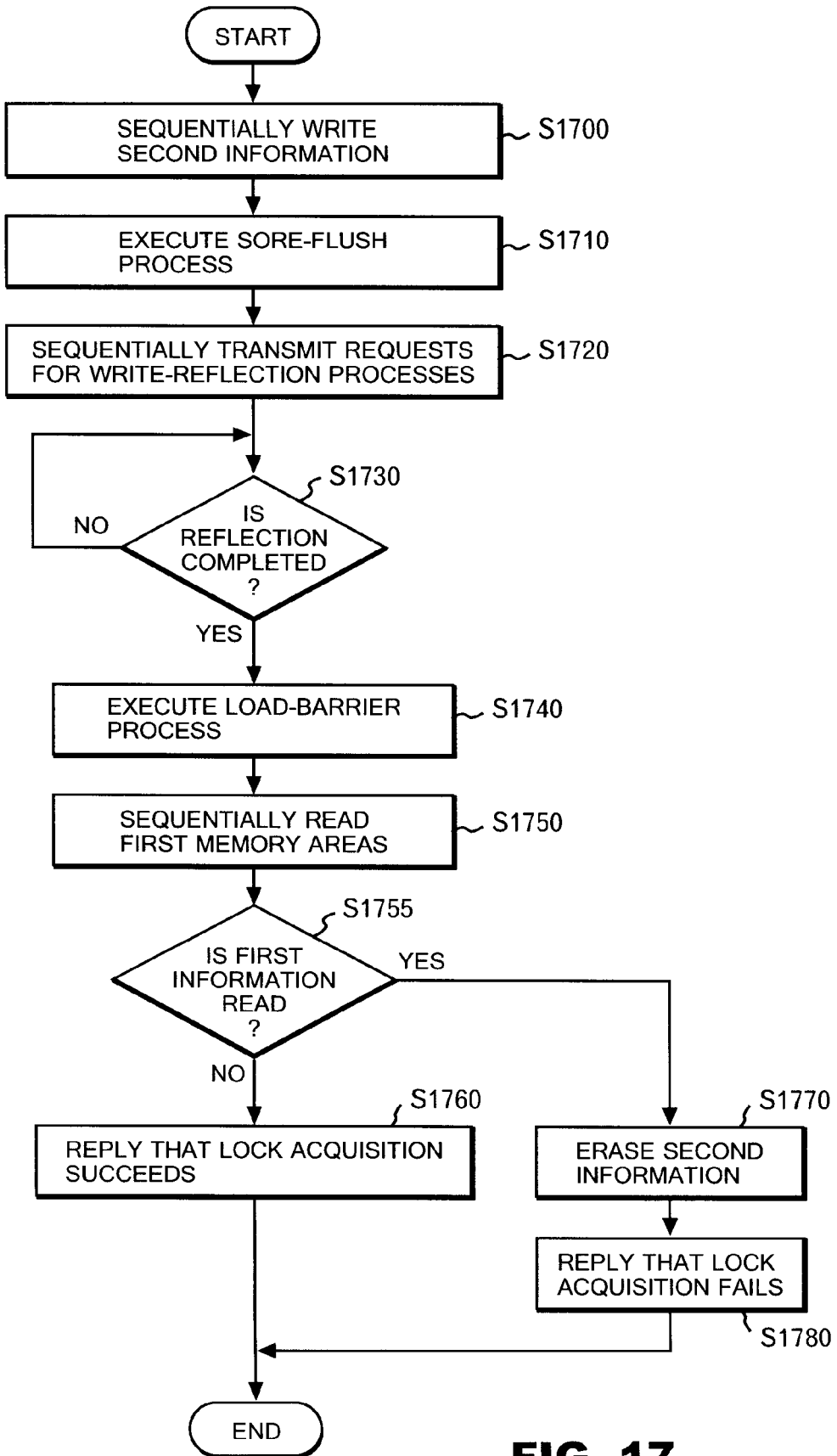
FIG. 17 is a flowchart of a process in which a second acquisition section 120 according to the second modified example of this embodiment attempts to acquire locks.

FIG. 17 is a flowchart of a process in which the second acquisition section 120 according to the second modified example of this embodiment attempts to acquire the locks. Note that the operation of the first acquisition section 100 is the same of that described by referring to FIG. 5. Accordingly, the explanation is omitted here, and only the operation of the second acquisition section will be described. Upon receipt of a request to acquire all the locks related to the first tasks 140-1 to 140-N from the second task 150, the second acquisition section 120 writes the second information to each of the second memory areas 165-1 to 165-N (S1700), and enables the second information to be referred to by all the first tasks 140 (S1710). Thereafter, the second acquisition section 120 sequentially transmits requests for the multiple write-reflection processes with the first tasks 140-1 to 140-N specified one by one (S1720).

Then, the second acquisition section 120 waits until all the first tasks 140 complete reflecting the written contents (S1730). Subsequently, upon completion of all the write-reflection processes (S1730: YES, and S1740), the second acquisition section 120 reads the first memory areas 162-1 to 162-N (S1750). On condition that the first information is not read from any of the first memory areas 162 (S1755: NO), the second acquisition section 120 sends a reply to the second task 150, indicating the success in acquiring all the locks related to the first tasks 140-1 to 140-N (S1760). In contrast, on condition that the first information is read from any of the first memory areas 162 (S1755: YES), the second acquisition section 120 erases the second information from the second memory area 165 corresponding to the first memory area 162 (S770), and then sends a reply indicating a failure to acquire all the locks to second task 150 (S1780).

After that, the second task attempts again to acquire the lock, which it has failed to acquire, in a similar manner. After all the locks are acquired, the second task starts a GC process.

As described above as the second modified example, in a case where first tasks executing a usual program and a second task sometimes executing a garbage collection when needed compete with each other to acquire locks, the first tasks acquire the locks at high frequency, and the second task acquires the locks at very low frequency. In a case where there is such a difference in the frequency of the lock acquisition, the mutual exclusion method described in this embodiment is especially effective. In other words, it is possible to reduce a time required for acquiring or attempting to acquire the locks as a whole system. Moreover, in order to acquire multiple locks all together, a time required for acquiring the locks can be reduced by executing in parallel all the write-reflection processes needed to acquire the respective locks.

Figure 18:
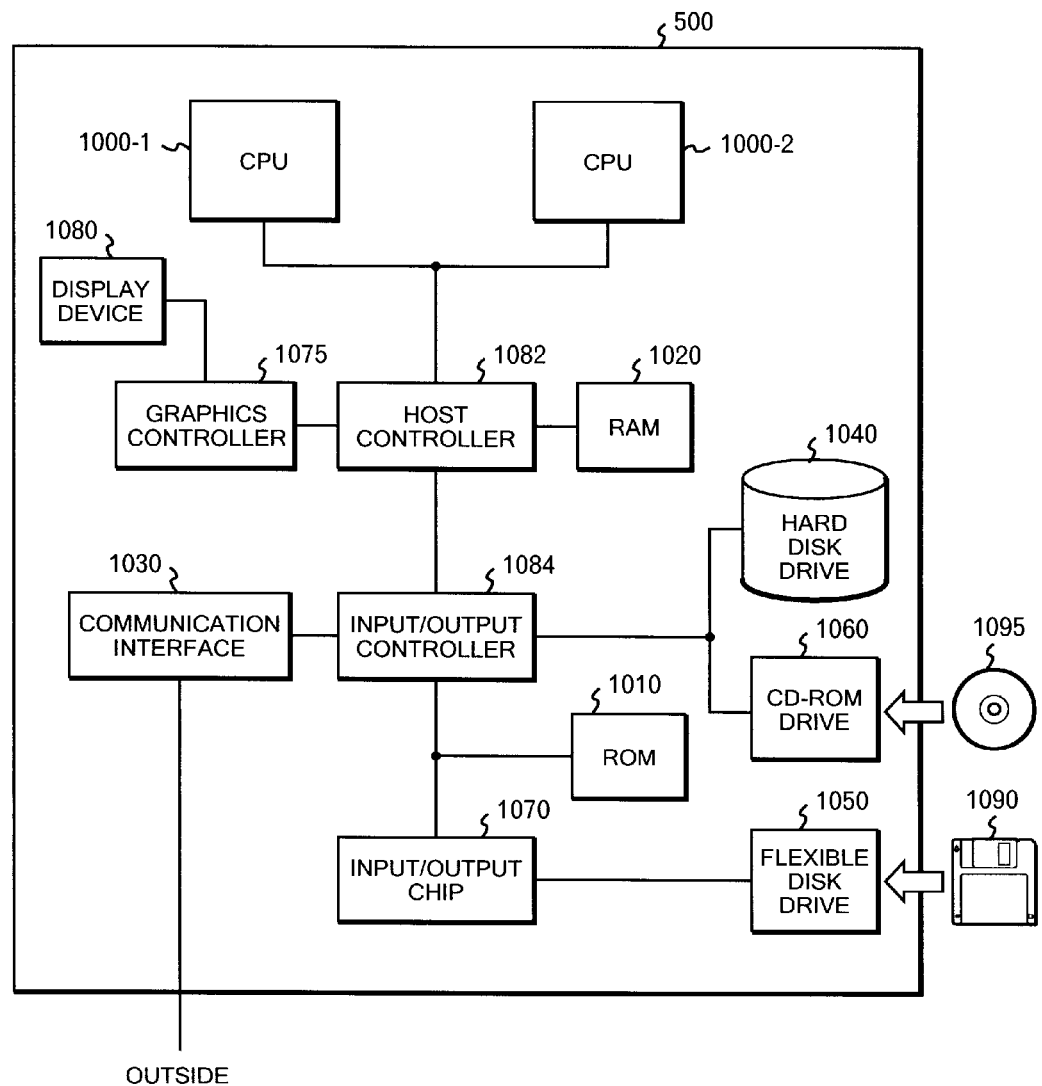
FIG. 18 shows an example of a hardware configuration of an information processing apparatus 500 functioning as the information system 10 according to the embodiment or the modified examples.

FIG. 18 shows an example of a hardware configuration of an information processing apparatus 500 functioning as the information system 10 in this embodiment and the modified examples. The information processing apparatus 500 includes a CPU peripheral unit, an input/output unit and a legacy input/output unit. The CPU peripheral unit includes a CPU 1000-1, a CPU 1000-2, a RAM 1020 and a graphics controller 1075, all of which are mutually connected to one another via a host controller 1082. The input/output unit includes a communication interface 1030, a hard disk drive 1040 and a CD-ROM drive 1060, all of which are connected to the host controller 1082 via an input/output controller 1084. The legacy input/output unit includes a ROM 1010, a flexible disk drive 1050 and an input/output chip 1070, all of which are connected to the input/output controller 1084.

The host controller 1082 mutually connects the RAM 1020 to the CPUs 1000-1 and 1000-2 and the graphics controller 1075, all of which access the RAM 1020 at a high transfer rate. The CPUs 1000-1 and 1000-2 operate according to programs stored in the ROM 1010 and the RAM 1020, and controls each of the components. The graphics controller 1075 obtains image data generated by the CPU 1000-1 or 1000-2 or the like in a frame buffer provided in the RAM 1020, and causes the obtained image data to be displayed on a display device 1080. In place of this, the graphics controller 1075 may internally include a frame buffer in which the image data generated by the CPU 1000-1 or 1000-2 or the like is stored.

The input/output controller 1084 connects the host controller 1082 to the communication interface 1030, the hard disk drive 1040 and the CD-ROM drive 1060, all of which are relatively high-speed input/output devices. The communication interface 1030 communicates with an external device via a network. In the hard disk drive 1040, programs and data to be used by the information processing apparatus 500 are stored. The CD-ROM drive 1060 reads a program or data from a CD-ROM 1095, and provides the read-out program or data to the RAM 1020 or the hard disk 1040.

Moreover, the input/output controller 1084 is connected to relatively low-speed input/output devices such as the ROM 1010, the flexible disk drive 1050 and an input/output chip 1070. In the ROM 1010, stored are programs such as a boot program executed by the CPUs 1000-1 or 1000-2 at a start-up time of the information processing apparatus 500 and a program depending on hardware of the information processing apparatus 500. The flexible disk drive 1050 reads a program or data from a flexible disk 1090, and provides the read-out program or data to the RAM 1020 or the hard disk drive 1040 via the input/output chip 1070. The input/output chip 1070 is connected to the flexible disk drive 1050 and various kinds of input/output devices, for example, through a parallel port, a serial port, a keyboard port, a mouse port and the like.

A program to be provided to the information processing apparatus 500 is provided by a user with the program stored in a storage medium such as the flexible disk 1090, the CD-ROM 1095 and an IC card. The program is read from the storage medium via the input/output chip 1070 and/or the input/output controller 1084, and is installed and executed on the information processing apparatus 500. Since an operation that the program causes the information processing apparatus 500 or the like to execute is identical to the operation of the information system 10 in the embodiment or the modified examples described by referring to FIGS. 1 to 17, the description is omitted here.

The program described above may be stored in an external storage medium. As the storage medium, any one of the following media may be used: an optical storing medium such as a DVD or a PD; a magneto-optic storing medium such as an MD; a tape medium; and a semiconductor memory such as an IC card, in addition to the flexible disk 1090 and the CD-ROM 1095. Alternatively, the program may be provided to the information processing apparatus 500 via a network, by using, as a storage medium, a storage device such as a hard disk or a RAM provided in a server system connected to a private communication network or the Internet.

As has been described, according to the embodiment and the modified example, in mutual exclusion between competing two tasks, one of the tasks (called a periphery task) causes a content written in a memory by the other task (called a primary task) to be forcibly reflected, thereby largely reducing a time required for the mutual exclusion for the primary task. This makes it possible to reduce a time required for acquiring the locks as a whole in a case supposed to frequently occur in practice in many situations, such as a case where only the primary task frequently acquires the lock. Moreover, an appropriate technique for a process for forcibly reflecting a written content can be selected and employed in conformity to a structure of a concerned one of computers of various types that currently exist or will possibly exist in the future.

Hereinabove, the present invention has been described by using the embodiment. However, the technical scope of the present invention is not limited to the above-described embodiment. It is obvious to one skilled in the art that various modifications and improvements may be made to the embodiment. Moreover, it is also obvious from the description in the scope of the present invention that thus modified and improved embodiments are included in the technical scope of the present invention.

The invention claimed is:

1. A method for causing an information processing apparatus to execute an exclusion control between a plurality of tasks, wherein the information processing apparatus includes a memory device which has a first memory area for storing first information indicating that a first task acquires or attempts to acquire a right to exclude, and a second memory area for storing second information indicating about which one of a plurality of second tasks acquires or attempts to acquire the right to exclude, and in which a time lag may occur between a time when the first task issues a writing instruction and a time when a written content is enabled to be referred to by the second task, and the method comprises the steps of:

reading the second memory area after issuance of the writing instruction to write the first information to the first memory area in response to a request for the first task to acquire the right to exclude;

making a reply indicating a success of the right to exclude acquisition on condition that the second information is not read;

erasing the first information from the first memory area, and making a reply indicating a failure of the right to exclude acquisition on condition that the second information is read;

erasing the first information from the first memory area in response to the request for the first task to release the right to exclude;

executing an atomic operation instruction to write the second information specifying the second task to the second memory area if the second information is not stored in the second memory area, in response to the request for the second task to acquire the right to exclude;

writing the second information to the second memory area, which enables the written content to be referred to by the first task, on occasion that the writing of the second information due to the atomic operation instruction succeeds, and thereafter executing a write-reflection process for enabling the content written in the first memory area by the first task to be referred to by the second task; which reads the first memory area after completion of the write-reflection process;

reading the first memory area after completion of the write-reflection process;

making the reply indicating the success of the right to exclude acquisition on condition that the first information is not read from the first memory area;

erasing the second information from the second memory area, and making the reply indicating the failure of the right to exclude acquisition on condition that the first information is read; and making the reply indicating the failure of the right to exclude acquisition on condition that the writing of the second information due to the atomic operation instruction is failed; and erasing the second information from the second memory area in response to the request for the second task to release the right to exclude.

* * * * *